(12) United States Patent
Farrell et al.

(10) Patent No.: US 10,279,920 B1
(45) Date of Patent: May 7, 2019

(54) FOREIGN OBJECT DEBRIS BARRIER FILTER APPARATUS FOR AN AIRCRAFT INTAKE SYSTEM

(71) Applicants: Brant Farrell, Opa-Locka, FL (US); Lance Edwards, Opa-Locka, FL (US)

(72) Inventors: Brant Farrell, Opa-Locka, FL (US); Lance Edwards, Opa-Locka, FL (US)

( * ) Notice: Subject to any disclaimer, the term of this patent is extended or adjusted under 35 U.S.C. 154(b) by 12 days.

(21) Appl. No.: 15/907,206

(22) Filed: Feb. 27, 2018

(51) Int. Cl.
| | | |
|---|---|---|
| *B01D 39/10* | (2006.01) | |
| *B01D 46/52* | (2006.01) | |
| *B64D 33/02* | (2006.01) | |
| *B64D 41/00* | (2006.01) | |

(52) U.S. Cl.
CPC ............ *B64D 33/02* (2013.01); *B01D 39/10* (2013.01); *B01D 46/521* (2013.01); *B64D 41/00* (2013.01); *B01D 2279/60* (2013.01); *B64D 2033/0213* (2013.01); *B64D 2033/0246* (2013.01)

(58) Field of Classification Search
None
See application file for complete search history.

(56) References Cited

U.S. PATENT DOCUMENTS

| | | | | |
|---|---|---|---|---|
| 3,421,296 A * | 1/1969 | Beurer, Sr. | ............ | B64D 33/02 209/710 |
| 3,449,891 A * | 6/1969 | Amelio | .................. | B64D 33/02 244/53 B |
| 3,789,589 A * | 2/1974 | Delany | .............. | B01D 46/0005 55/481 |
| 4,002,887 A * | 1/1977 | Ouimette | .................. | G01S 5/00 235/449 |
| 5,236,478 A * | 8/1993 | Lewis | ................ | B01D 46/0006 34/82 |
| 5,435,837 A * | 7/1995 | Lewis | ........................ | H05F 3/04 34/480 |
| 6,264,137 B1 * | 7/2001 | Sheoran | ................. | B64D 33/02 244/53 B |
| 6,595,742 B2 * | 7/2003 | Scimone | ................ | B64D 33/02 244/53 B |
| 6,651,929 B2 * | 11/2003 | Dionne | .................. | B64D 33/08 165/44 |
| 6,824,582 B2 * | 11/2004 | Wilson | ............... | B01D 46/0005 55/385.3 |
| 7,344,107 B2 * | 3/2008 | Campbell | .............. | B64D 41/00 244/53 B |

(Continued)

FOREIGN PATENT DOCUMENTS

EP    3034408 A1 *    6/2016    ............. B64D 33/00

*Primary Examiner* — Duane Smith
*Assistant Examiner* — Brit E. Anbacht
(74) *Attorney, Agent, or Firm* — The Rapacke Law Group, P.A.

(57) ABSTRACT

Embodiments described herein provide for a compartment based inlet barrier for foreign object debris to an auxiliary power unit of an aircraft or watercraft. The apparatus is configured to fit within an inlet compartment of an auxiliary power unit and provides a particulate separator for fluid flow to the auxiliary power units using a porous pleated filter media having a corrosion resistant exterior frame and enables a minimal pressure differential throughout the apparatus while in use. The apparatus may further be releasably secured/unsecured using a plurality of fasteners which enable a user to readily assemble and disassemble.

10 Claims, 7 Drawing Sheets

(56) References Cited

U.S. PATENT DOCUMENTS

| | | | | |
|---|---|---|---|---|
| 8,444,083 | B2* | 5/2013 | Light | B64D 41/00 |
| | | | | 244/129.4 |
| 8,961,634 | B2* | 2/2015 | Boyce | B01D 46/103 |
| | | | | 415/121.2 |
| 9,102,416 | B1* | 8/2015 | Cutler | B64D 37/32 |
| 9,254,924 | B2* | 2/2016 | Nager | B64D 41/00 |
| 2002/0182062 | A1* | 12/2002 | Scimone | B64D 33/02 |
| | | | | 415/121.2 |
| 2003/0080244 | A1* | 5/2003 | Dionne | B64D 33/08 |
| | | | | 244/57 |
| 2004/0112020 | A1* | 6/2004 | Wilson | B01D 46/0005 |
| | | | | 55/385.3 |
| 2005/0169813 | A1* | 8/2005 | D'Amico | A61L 9/042 |
| | | | | 422/124 |
| 2006/0016042 | A1* | 1/2006 | Bruneau | A47L 5/38 |
| | | | | 15/314 |
| 2006/0076430 | A1* | 4/2006 | Lee | B64D 41/00 |
| | | | | 239/10 |
| 2011/0001003 | A1* | 1/2011 | Krahl | B01D 46/0035 |
| | | | | 244/58 |
| 2012/0292455 | A1* | 11/2012 | DeDe | B64D 41/00 |
| | | | | 244/53 B |
| 2013/0001369 | A1* | 1/2013 | Light | B64D 41/00 |
| | | | | 244/53 B |
| 2013/0213729 | A1* | 8/2013 | Kowal | B64C 1/40 |
| | | | | 181/175 |
| 2016/0177724 | A1* | 6/2016 | Sheoran | B64D 33/00 |
| | | | | 415/121.2 |
| 2017/0174356 | A1* | 6/2017 | Lucas | B64D 33/02 |
| 2017/0258951 | A1* | 9/2017 | Kemp | A61L 2/07 |
| 2018/0106225 | A1* | 4/2018 | Dionne | F02B 53/14 |
| 2018/0156334 | A1* | 6/2018 | Takeuchi | F16J 15/065 |

\* cited by examiner

FOREIGN OBJECT DEBRIS BARRIER FILTER APPARATUS FOR AN AIRCRAFT INTAKE SYSTEM

This application claims priority to U.S. provisional patent application No. 62/464,212 titled "A Foreign Object Debris Barrier Filter For An Auxiliary Power Unit Intake System" to Brant Farrell filed Feb. 27, 2017 which is hereby incorporated by reference.

FIELD

The present embodiments relate to a foreign object debris barrier apparatus for an aircraft intake system, and in particular, to a foreign object debris barrier filter apparatus which provides protection to the auxiliary power unit and downstream components of an aircraft from the corrosive and/or erosive debris hazards associated with operations in a variety of settings.

BACKGROUND

In aircraft frames, the main propulsions engines not only provide propulsion but the bleed air is recirculated and used to drive a variety of rotating parts such as a generator, compressor, or pumps and further supply both electric and pneumatic power to the aircraft system. However, when the aircraft is grounded its main engine(s) may not be running, and auxiliary power units ("APU") are used to provide aircraft systems power and/or start propulsion systems and engines.

These aircraft are often operated in a variety of environments and climate which enable high concentrations of dust and particulates to be captured with the inlets. These particulates when ingested within are captured in the fluid flow of the APU decrease efficiency and adversely affect performance. For example, these particulates or foreign object debris ("FOD") can corrode and/or erode the interior passageway and parts within a turbine plug apertures within a cooled combustor. To alleviate this debris from entering the aircraft, procedures such as "FOD walk-down" are implemented to capture any debris along the runaway before being sucked into the turbines or APU's.

To overcome these challenges, many aircraft have included particulate separators, vortex panels, and multi-channel particulate separators. However, each of these designs is often difficult to maintain and may not be readily cleaned or installed between uses.

Though there are a variety of filtering devices and systems available within the public domain such as U.S. Pat. No. 3,970,439 to Murphy; or U.S. Pat. No. 3,778,983 to Rygg, these references fail to disclose a particulate filter for an auxiliary power unit which may be easily assembled/disassembled and cleaned between uses.

SUMMARY OF THE INVENTION

Embodiments described herein provide a foreign object particulate filter configured for an Auxiliary Power Unit of an aircraft, and more specifically for the C-130 and it's derivitives, which may include, but not limited to, L-100 and L-382 aircraft. The apparatus is configured to provide an air inlet filtration system for Post-1974 C-130 Models and Pre-1974 C-130 models with retrofit APU's allowing the APU to draw clean air after passing through the filter. The apparatus includes a metallic housing with provisions to retain a porous, cleanable and reusable corrosion resistant filter assembly. The filter assembly is easily accessible through a panel or door retained by various hardware.

In an embodiment, the apparatus is configured to prominently display a part number, description and serial number.

In another embodiment, a foreign object debris particulate filter for use on a variety of vehicles includes an auxiliary power unit, the apparatus is comprised of a filter disposed within a frame. The filter has a porous surface to permit the flow of air through the filter. A housing has an interior cavity dimensioned to receive the frame. The housing is sealed to an air intake duct and an auxiliary power unit, thus filtering air thereto. The filter provides a barrier filter and prohibits the ingress of particles to the APU.

In an embodiment, the filter has a mesh screen with a cleanable filter media. This allows the filter to be cleaned and replaced while improving the filtering capabilities of the apparatus. The filter media may be pleated to increase the surface area of the filter.

In an embodiment, the apparatus is further comprised of an aperture positioned at an end of the cavity, and an access door removably engaged with the aperture. The access door is sealingly engaged with the aperture when in use, while providing a means for the cavity to be opened and the filter therein to be removed.

In an embodiment, the frame seals with the cavity to force air through the filter media during use.

A handle may be provided along with the frame to facilitate the maintenance of the filter.

Further features and advantages of the invention will appear more clearly on a reading of the following detail description of the preferred embodiment of the invention, which is given by way of non-limiting example only and with reference to the accompanying drawings.

BRIEF DESCRIPTION OF THE DRAWINGS

A more complete understanding of the embodiments, and the attendant advantages and features thereof, will be more readily understood by references to the following detailed description when considered in conjunction with the accompanying drawings wherein.

DETAILED DESCRIPTION

The specific details of the single embodiment or variety of embodiments described herein are set forth in this application. Any specific details of the embodiments are used for demonstration purposes only and no unnecessary limitation or inferences are to be understood therefrom.

Any reference to "invention" within this document is a reference to an embodiment of a family of inventions, with no single embodiment including features that are necessarily included in all embodiments, unless otherwise stated. Furthermore, although there may be references to "advantage's" provided by some embodiments, other embodiments may not include those same advantages, or may include different advantages. Any advantages described herein are not to be construed as limiting to any of the claims.

Before describing in detail exemplary embodiments, it is noted that the embodiments reside primarily in combinations of components related to the system. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Specific quantities, dimensions, spatial characteristics, compositional characteristics and performance characteristics may he used explicitly or implicitly herein, but such specific quantities are presented as examples only and are approximate values unless otherwise indicated. Discussions and depictions pertaining to these, if present, are presented as examples only and do not limit the applicability of other characteristics, unless otherwise indicated.

The embodiments shown provide for a foreign object debris harrier apparatus for an aircraft intake system which provides particulate free air intake to auxiliary power units ("APU") on either an aircraft or watercraft. The clean fluid flow provides propulsion and bleed air to aircraft and watercraft alike. As illustrated in the various embodiments the filter ensures that both pneumatic bleed air system and shaft powers provide for maximum efficiency to secondary system such as generators, turbines, and auxiliary systems.

Figure 1:
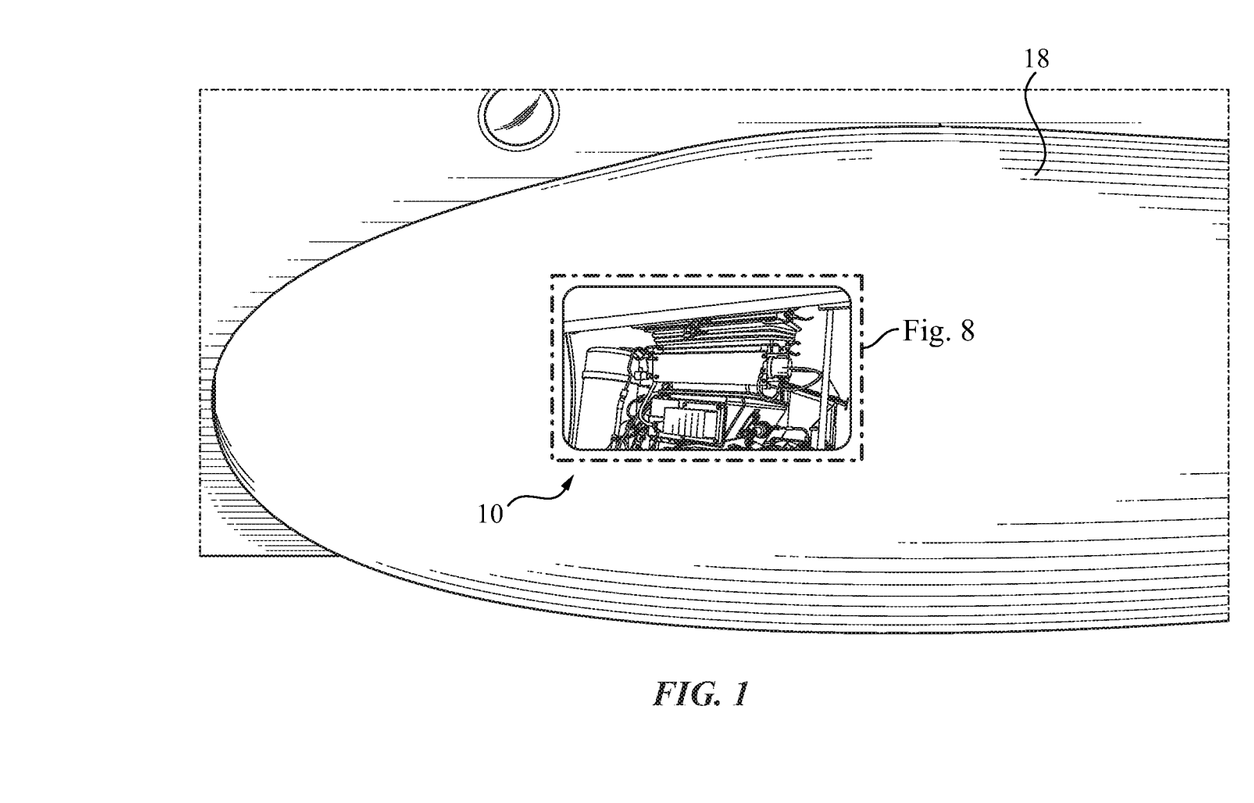
FIG. 1 is a perspective view of a foreign object debris barrier for an aircraft intake system affixed within the fuselage of an aircraft, according to an embodiment of the present invention.

Referring now to the drawings wherein like reference numerals designate identical or corresponding parts throughout the views. There is shown in FIG. 1 view of an aircraft exterior having apparatus 10 for the filtration of particles to the APU system of said aircraft. The light weight apparatus 10 includes a porous pleated filter 12 housed within a wire mesh exterior portion 16. The filter 12 and exterior wire mesh 16 are affixed to a corrosion resistant frame 20. During use, the apparatus is configured to be placed within the inlet door/panel of the APU's housed within the fuselage body of the aircraft 18 (as shown) or other craft. When releasably inserted any large foreign object debris is initially captured within larger apertures within the inlet housing of the APU. Any remaining FOD (i.e., sand, salt, dirt. dust) is captured by the pleated filter media where it may he removed during cleaning.

An air intake port may be positioned on the exterior of the craft fuselage 18. The intake port is in fluid communication with the apparatus 10 such that clean air is delivered to the APU and aircraft subsystems therein.

Figure 2:
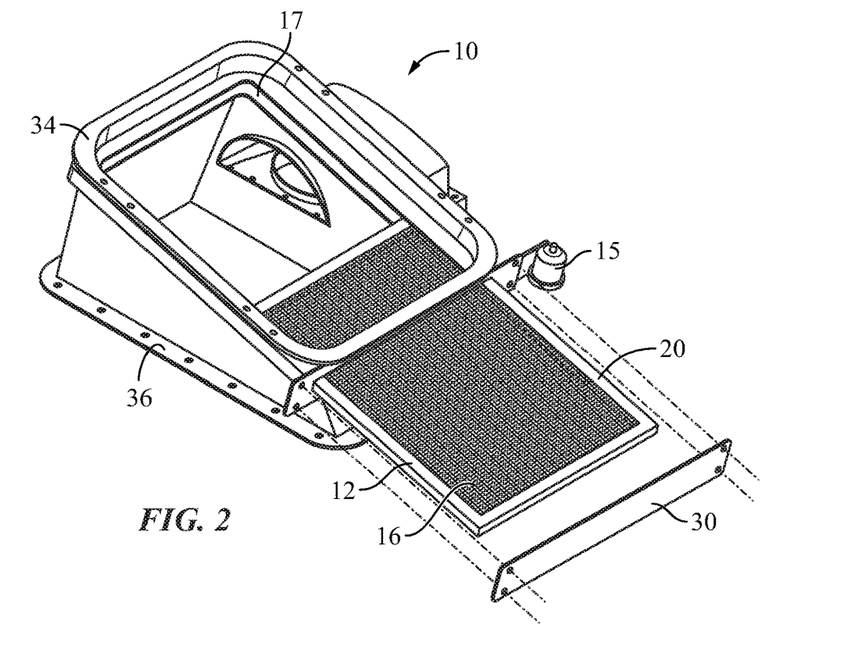
FIG. 2 is an exploded view of the apparatus, according to an embodiment of the present invention.

In specific reference to FIG. 2, the apparatus 10 is comprised of a housing wherein filter 12 is stored during use. The filter 12 is comprised of a frame 20 and mesh exterior portion 14. While many filter configurations may be utilized, one such implementation is a porous pleated filter media 12 which is contained within a wire mesh housing 14 about the exterior portion 16. The apparatus frame 18 may be configured with a corrosion resistant frame 20 which prevents corrosion about the exterior surface 20. The mesh housing 14 includes a plurality of larger dimensioned apertures which is designed to filter large particulates. It is further contemplated the rectangular elongated frame is comprised of a light-weight metallic material such as an aluminum, however the apparatus may be constructed with any non-corrosive material.

In an embodiment, the frame 20 may be inserted into the housing using ridge portion 17 permitting the frame 20 to slide into position. The frame 20 may contact ridge portion 17 to substantially prohibit airflow therebetween and thus require air to pass through the filter 12.

The filter 12 is housed within a retention frame comprised of a mesh housing 14 and frame 20. The filter 12 is disposed within the frame 20 to form a generally air-fight seal therebetween. The airtight seal ensures that air is forced through the filter and thus preventing contaminants from bypassing the filter and entering the downstream components of the aircraft.

The filter 12 may be retained within the frame 20 by a friction fit, adhesive material, or other physical connection such as a polymeric material including polysulphite or polyurethane, or an epoxy. The polymeric material functions as a sealant to seal the perimeter (side edges) between the filter 12 and the frame 20. The sealant structurally adheres the filter 12 to the frame 20 and prevents unfiltered air from passing between the frame 20 and filter 12. The filter frame 20 is constructed such that if it should be contaminated, it may be removed and cleaned or replaced.

The pleating of the filter effectively increases the surface area and rigidity of the filter. Effective at separating contaminants, the filter provides a low pressure drop characteristic across the filter. The filter is comprised of filter media capable of achieving high particle removal efficiencies. The filter may also be resistant to water and other liquid contaminants encountered during typical operation.

To improve filter efficiency for finer particles, the filter media may be impregnated with oil. The oil improves particle removal and helps resist moisture absorption by the filter media to render it substantially waterproof. It is understood the contaminant separators of various configurations, such as non-pleated filters, filters formed with a different construction, an non-filtering inertial particle separators do not depart from the scope of this invention.

In an embodiment, an indicator 15 is in communication with the apparatus 10 and functions to monitor pressure conditions and filter health.

Figure 3:
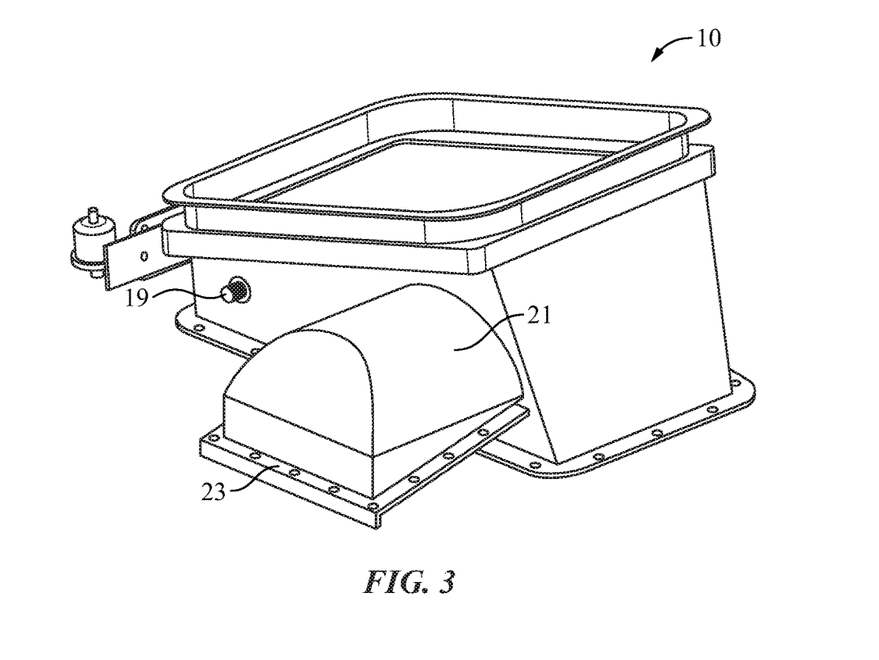
FIG. 3 is a rear perspective view of the apparatus, according to an embodiment of the present invention.

In reference to FIG. 3, a rear perspective of the apparatus 10 is illustrated according to an embodiment of the present invention. Duct 21 is positioned on the sidewall of the apparatus and configured to direct the flow of air to the APU. The duct is engaged via flange portion 23 positioned on the periphery of the duct. A threaded bung 19 may be positioned on the sidewall of the apparatus substantially adjacent to the duct 21.

Figure 4:
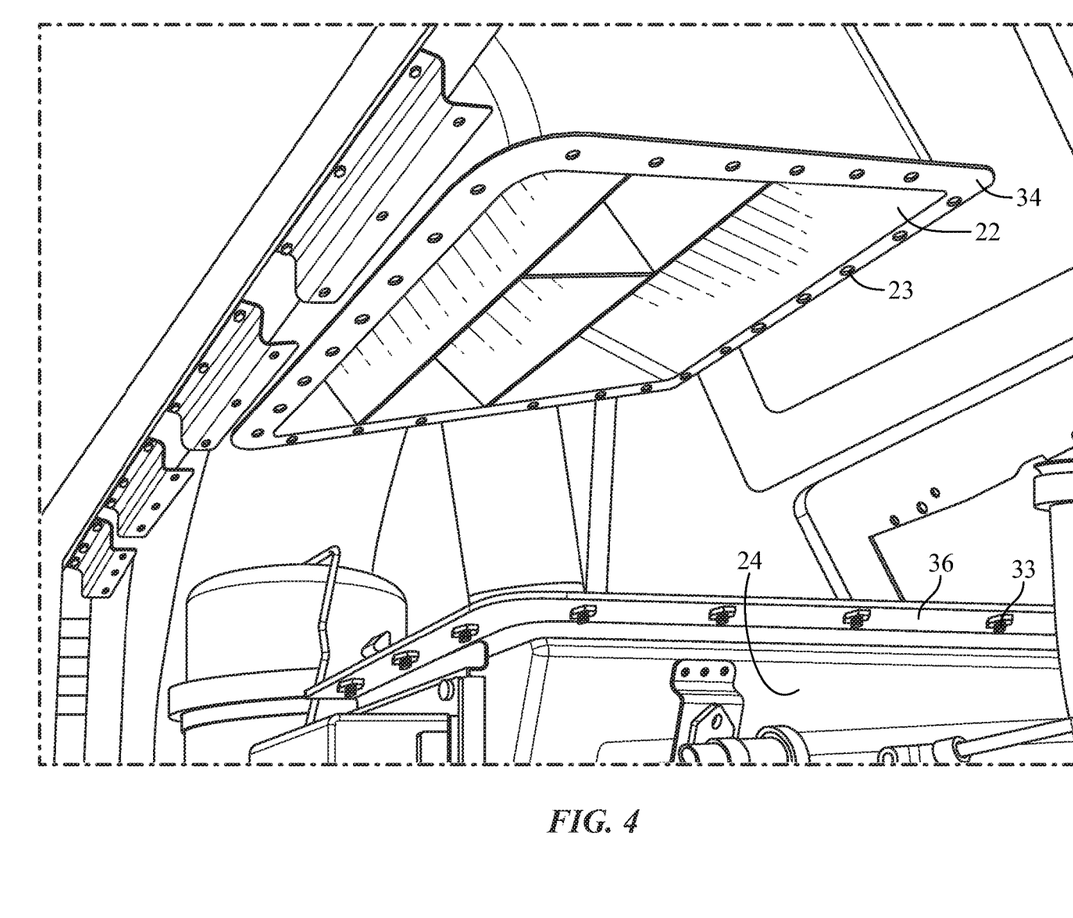
FIG. 4 is a perspective view of the intake duct and the APU having the apparatus removed, according to an embodiment of the present invention.

In reference to FIG. 4, the apparatus 10 is positioned between the APU inlet duct 22 and the APU system 24. In the present embodiment, apparatus 10 is dimensioned to engage with the APU inlet duct 22 and APU 24. Each port 22 and 24 is comprised of flange portions 26, 28 extending from their perimeter. Flange portion 26, 28 are comprised of apertures wherein fasteners may be disposed to fixably and sealingly engage with the apparatus 10 to minimize air leaks and eliminate the risk of the intake of materials. Fasteners permit a user such as maintenance personnel remove and replace the apparatus 10 for service or cleaning.

The APU inlet duct 22 is configured to provide inlet air into the APU 24 via apparatus 10. Air may be directed to any compartment of the APU 24 or individual system components thereof. APU inlet duct is in fluid communication with the apparatus 10 and directs air through the filter before entering the APU 24.

Figure 5:
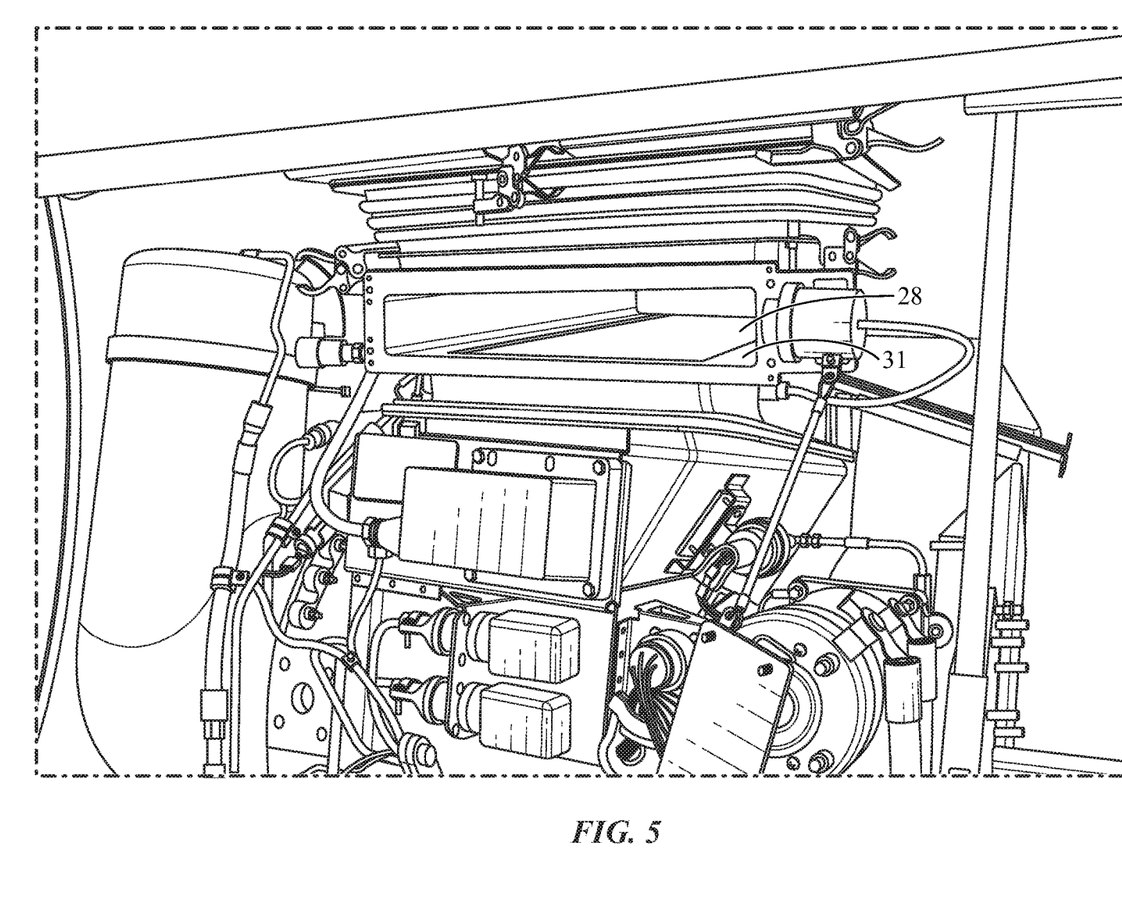
FIG. 5 is a perspective view of the apparatus with the filter removed, according to an embodiment of the present invention.
Figure 6:
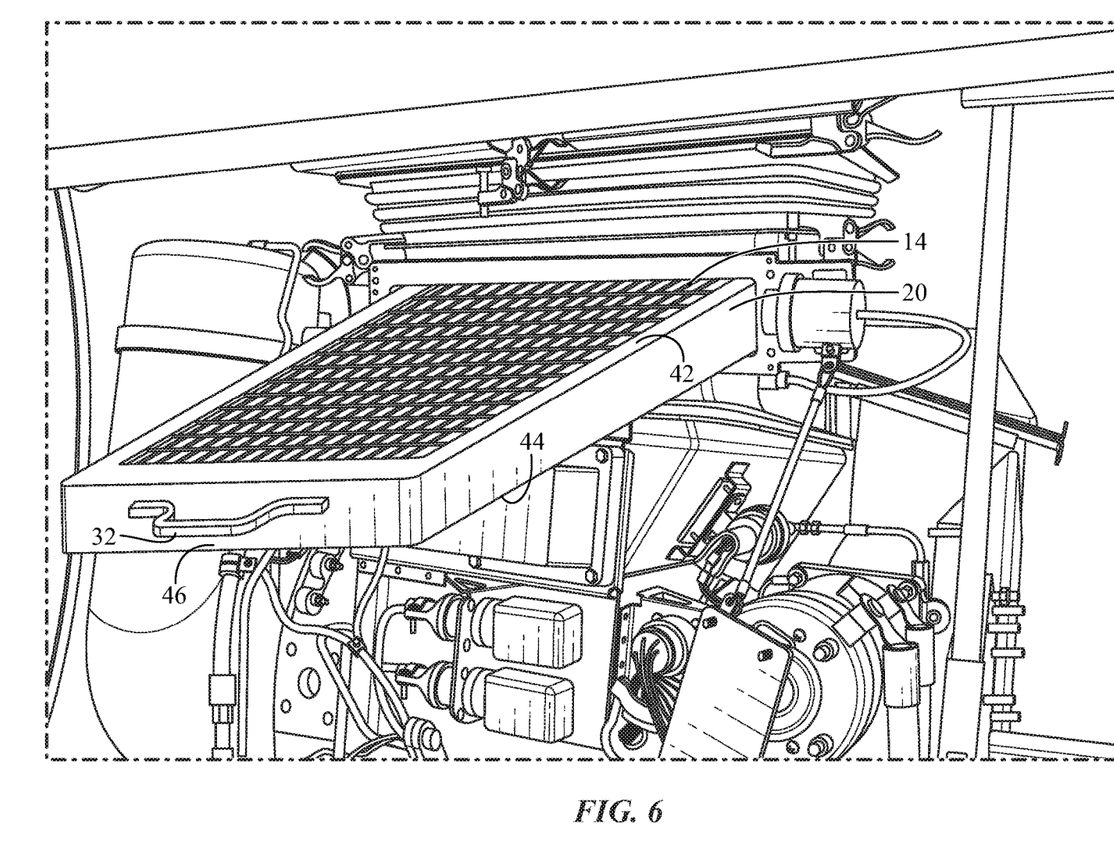
FIG. 6 is a perspective view of the apparatus having a filter, according to an embodiment of the present invention.
Figure 7:
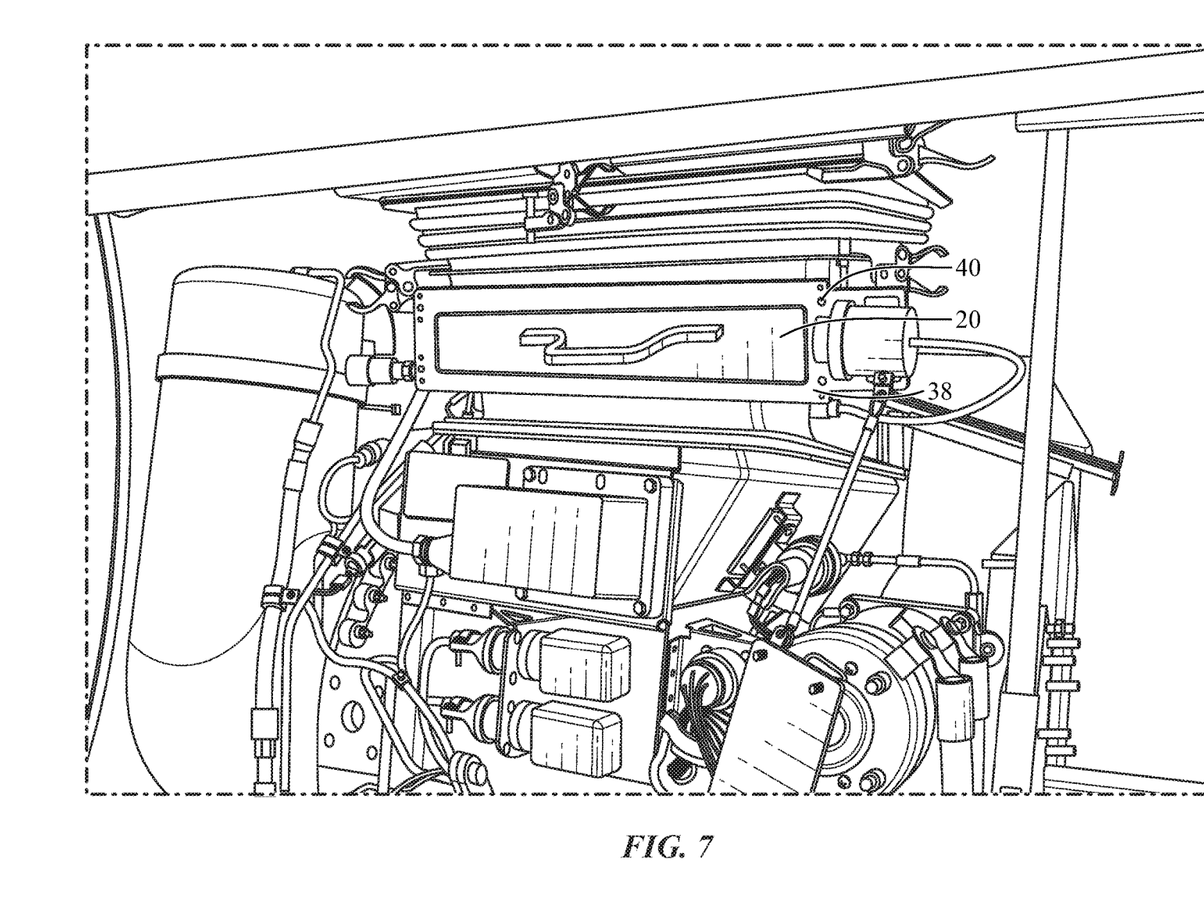
FIG. 7 is a perspective view of the apparatus having a filter disposed therein, according to an embodiment of the present invention.

In an embodiment, and as illustrated in FIGS. 5-7, the filter 12 is disposed within a filter housing 26 which may be constructed of stainless steel or similar corrosion resistant and rigid material. The filter housing 26 in the present embodiment is a rectangular cuboid having a cavity wherein the filter is positioned. Exterior wire mesh 16 is configured to retain the filter within the cavity of the housing 26 while permitting air to pass through while particulates are captured within the filter 12.

The filter housing 26 along with the filter 12 therein is disposed within an apparatus cavity 28. The cavity 28 is similarly dimensioned as the filter housing 26 permitting selective ingress and egress therein. This also allows for the filter to be removed from the apparatus 10 for cleaning or replacement.

In specific reference to FIG. 6, the frame 20 is comprised of top and bottom planar surfaces 42, 44 as well as sidewalk about the perimeter of the frame 20.

In an embodiment, the cavity 28 is configured as an air transference area wherein air is transmitted through the intake duct 22 and into the cavity 28 through the APU 24.

Figure 8:
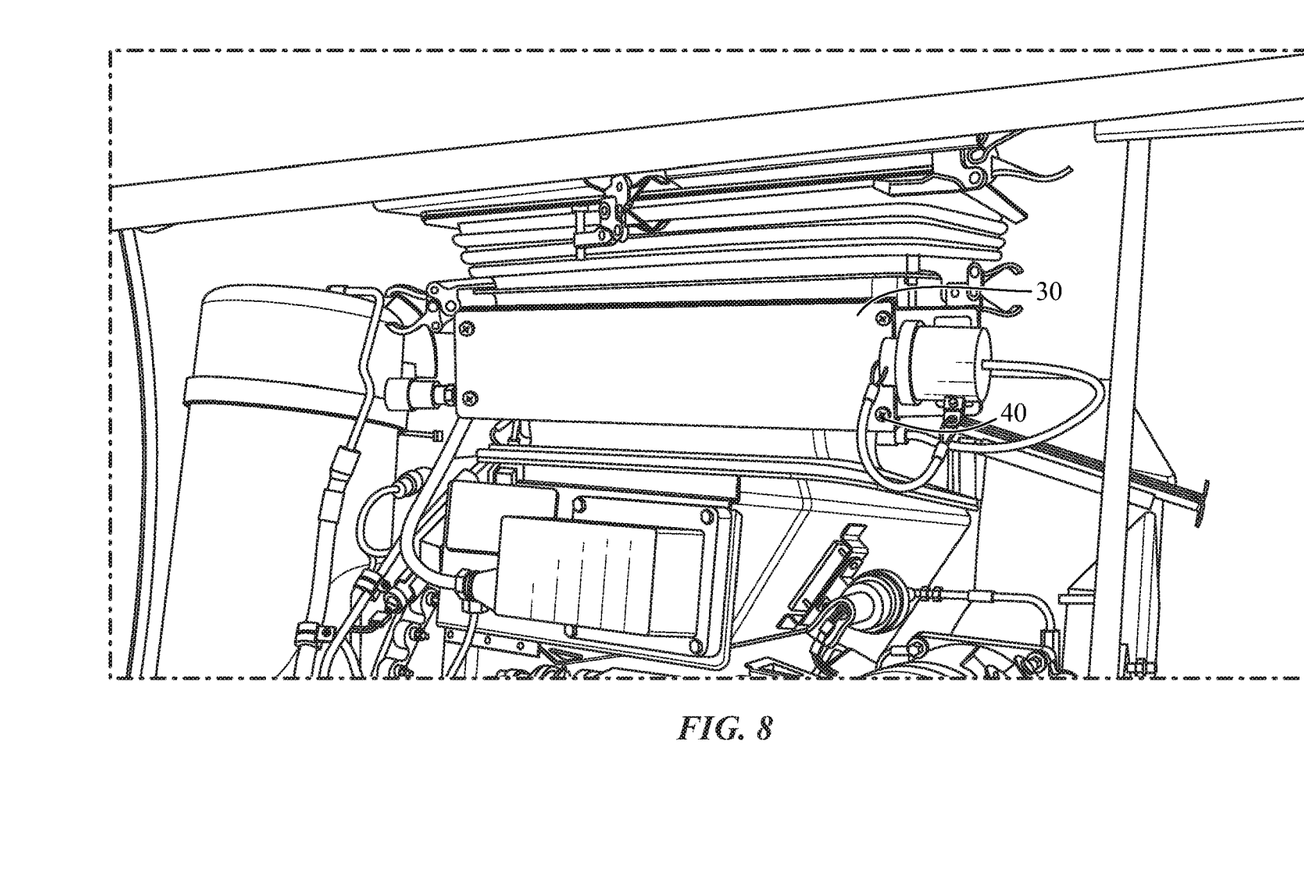
FIG. 8 is a perspective view of the apparatus with the access door engaged, according to an embodiment of the present invention.

In an embodiment and in reference to FIG. 8, access door 30 is removably engaged with the apparatus 10 to cover and seal the filter within the cavity 28 during use. The access door 30 is dimensioned to cover the aperture 31 in communication with the cavity 28, such that a hermetic engagement is attained once the access door is fastened to the apparatus 10.

In an embodiment, the access door 30 is comprised of a plurality of apertures near the periphery to receive fasteners therethrough. Fasteners may include screws or similar means of removably engaging objects.

In an embodiment, the access door 30 may affix to a receiver 38 as illustrated in FIG. 7. Fastening means 40 may be positioned near the perimeter to permit the user to affix the access door 30 to the receiver 38. Fastening means may include a series of screws, or similar fastener known in the arts.

In an embodiment, the filter 12 permits materials or markings to be affixed thereto. These materials may include a filter description and instructions for the proper utilization and installation of the filter. Further, the filter may have a serial number and part number affixed or permanently marked thereto permitting maintenance individuals to properly identify the proper filter. Materials may be affixed with an adhesive, as known in the labeling arts, or materials may be engraved, embossed, or otherwise permanently affixed to the exterior portion of the filter.

A handle 32 may be affixed to an exterior surface such as the front surface 46 of the filter housing 26 facilitating the removal and replacement of the filter housing during maintenance.

Because of the unique structural features of the particle separator of this invention, it is seen that there is no need for existing engines to be modified nor is a large area required to accommodate the separator. The separator takes up a relatively small space and may be oriented in any direction. Further, it does an efficient job with but a small pressure drop thereacross. Accordingly, it can be seen that this invention accomplishes the objectives hereinabove set forth.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present embodiment is not limited to what has been particularly shown and described hereinabove. A variety of modifications and variations are possible in light of the above teachings without departing from the following claims.

What is claimed is:

1. An auxiliary power unit assembly that provides air flow to or from an auxiliary power unit (APU), the assembly comprising:
    an APU inlet duct having a first aperture at an end of the APU inlet duct, the first aperture commensurate in size with the end of the APU inlet duct;
    a filter compartment having a second aperture and a third aperture on opposite ends of the filter compartment, the second aperture facing the APU inlet duct and being commensurate in size with an end of the filter compartment and commensurate in size with the first aperture, the third aperture facing the APU and being commensurate in size with an opposite end of the filter compartment;
    a compressible bellows interposed between the APU inlet duct and the filter compartment, the compressible bellows having an air intake aperture and an air output aperture, the air intake aperture being commensurate in size with the end of the APU inlet duct, the air output aperture being commensurate in size with the end of the filter compartment facing the compressible bellows and being commensurate in size with the second aperture of the filter compartment, the compressible bellows configured to channel air from the air intake aperture to the air output aperture;
    the filter compartment being interposed between the compressible bellows and the APU, the filter compartment forming an air channel through which channeled air passes from the APU inlet duct, through the bellows and through the filter compartment to the APU, the filter compartment configured to form an airtight seal with the compressible bellows at the second aperture of the filter compartment and having, at a perimeter of the filter compartment, a flange that encompasses an entire side of the filter compartment, the filter compartment having an opening in a wall transverse to the first inlet to receive a slide-able filter such that all air flowing through the compressible bellows flows through the filter when the filter is inserted into the filter compartment;
    a filter holder configured to be remove-ably slide-able into the opening in a direction transverse to, in close proximity to and encompassing an entire cross section of the of the filter compartment, the filter holder configured to hold a filter, the filter being positioned transverse to both the second aperture and third aperture of the filter compartment; and an APU compartment containing the APU and configured to form an airtight seal with the filter compartment and configured to channel the air flowing through the filter to or from the APU.

2. The assembly of claim 1, wherein, when the filter holder is slid into the position where a frame of the filter holder mates with a flange of the filter compartment, the plate is positioned to mate with a frame of the filter compartment to provide an airtight seal at the opening so that no air flows through the opening.

3. The assembly of claim 2, further comprising a duct attached to the wall of the filter compartment, the duct configured to channel air to or from the filter compartment.

4. The assembly of claim 3, further comprising an indicator configured to monitor pressure conditions within the assembly.

5. The assembly of claim 3, wherein the filter remove-ably fits in the filter holder via a friction fit.

6. The assembly of claim 3, wherein the filter has edges that are adhered to the filter holder via a sealant.

7. An auxiliary power unit assembly configured to provide filtering to air intake by an auxiliary power unit (APU), the assembly comprising:

an APU inlet duct having baffles to channel air to the APU, the APU having a length and a width and a first aperture commensurate in size with the length and the width and facing toward an inlet aperture of the APU;

a compressible bellows with a second aperture facing the first aperture and commensurate in size with the first aperture, and with a third aperture commensurate in size with the first aperture and commensurate in size with a length and width of a filter compartment and facing toward the APU;

the filter compartment having a first opening commensurate in size with the length and width of the filter compartment, and having a second opening commensurate in size with the length and width of the filter compartment, the second opening being commensurate in size with a length and width of the APU; and a filter holder configured to position a filter in the filter compartment transverse to the first and second openings of the filter compartment.

8. The assembly of claim 7, wherein the first opening and the second opening of the filter compartment are parallel.

9. The assembly of claim 7, wherein the first aperture of the APU inlet duct is parallel with an aperture of the APU.

10. The assembly of claim 7 wherein the first aperture of the APU inlet duct is concentric with an aperture of the APU.

\* \* \* \* \*